(12) United States Patent
Muralidhar et al.

(10) Patent No.: US 11,768,533 B2
(45) Date of Patent: *Sep. 26, 2023

(54) PLATFORM POWER CONSUMPTION REDUCTION VIA POWER STATE SWITCHING

(71) Applicant: Tahoe Research, Ltd., Dublin (IE)

(72) Inventors: Rajeev D. Muralidhar, Bangalore (IN); Harinarayanan Seshadri, Bangalore (IN); Vishwesh M. Rudramuni, Bangalore (IN); Richard Quinzio, Sophia Antipolis (FR); Christophe Fiat, Nice (FR); Aymen Zayet, Antibes (FR); Youvedeep Singh, Bangalore (IN); Illyas M. Mansoor, Bangalore (IN)

(73) Assignee: Tahoe Research, Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,635

(22) Filed: Aug. 2, 2022

(65) Prior Publication Data

US 2023/0004209 A1    Jan. 5, 2023

Related U.S. Application Data

(63) Continuation of application No. 16/741,215, filed on Jan. 13, 2020, now Pat. No. 11,422,615, which is a (Continued)

(30) Foreign Application Priority Data

Dec. 26, 2012  (IN) .......................... 5444/CHE/2012

(51) Int. Cl.
*G06F 1/32*    (2019.01)
*G06F 1/3287*  (2019.01)
(Continued)

(52) U.S. Cl.
CPC .......... *G06F 1/3287* (2013.01); *G06F 1/3265* (2013.01); *G06F 1/3206* (2013.01); *Y02D 10/00* (2018.01)

(58) Field of Classification Search
CPC ....................................................... G06F 1/32
See application file for complete search history.

(56) References Cited

U.S. PATENT DOCUMENTS 5,692,204 A   11/1997  Rawson et al.
5,757,365 A    5/1998  Ho
(Continued)

FOREIGN PATENT DOCUMENTS

CN       1690924 A    11/2005
CN     101470518 A     7/2009
(Continued)

OTHER PUBLICATIONS

Examination Report received for Indian Patent Application No. 5444/CHE/2012 dated Mar. 11, 2021, 3 pages.
(Continued)

*Primary Examiner* — Paul B Yanchus, III
(74) *Attorney, Agent, or Firm* — Studebaker & Brackett PC

(57) ABSTRACT

Methods and apparatus relating to platform power consumption reduction via power state switching are described. In one embodiment, control logic causes a processor to enter a first low power consumption state (e.g., S0ix) instead of a second low power consumption state (e.g., S3) based on whether a threshold time period exists between a first wake event (e.g., corresponding to a first one of one or more awake requests) and a second wake event (e.g., corresponding to a second one of the one or more awake requests). Other embodiments are also claimed and disclosed.

20 Claims, 10 Drawing Sheets

Related U.S. Application Data continuation of application No. 15/984,185, filed on May 18, 2018, now Pat. No. 10,564,705, which is a continuation of application No. 14/139,864, filed on Dec. 23, 2013, now Pat. No. 10,007,323.

(51) Int. Cl.
    *G06F 1/3234*    (2019.01)
    *G06F 1/3206*    (2019.01)

(56) References Cited

U.S. PATENT DOCUMENTS

| | | | |
|---|---|---|---|
| 6,260,150 | B1 | 7/2001 | Diepstraten et al. |
| 6,317,839 | B1 | 11/2001 | Wells |
| 6,802,018 | B2 | 10/2004 | Bormann et al. |
| 7,165,132 | B1 | 1/2007 | Asato et al. |
| 7,313,797 | B2 | 12/2007 | Sundaram et al. |
| 7,577,856 | B2 | 8/2009 | Oshins et al. |
| 7,962,771 | B2 | 6/2011 | Song et al. |
| 8,775,836 | B2 | 7/2014 | Muralidhar et al. |
| 8,806,241 | B2 | 8/2014 | Shimizu et al. |
| 9,021,287 | B2 | 4/2015 | Hildebrand et al. |
| 10,007,323 | B2 | 6/2018 | Muralidhar et al. |
| 10,564,705 | B2 * | 2/2020 | Muralidhar ........... G06F 1/3287 |
| 11,422,615 | B2 * | 8/2022 | Muralidhar ........... G06F 1/3265 |
| 2003/0061526 | A1 | 3/2003 | Hashimoto |
| 2003/0105983 | A1 | 6/2003 | Brakmo et al. |
| 2004/0153867 | A1 | 8/2004 | Mcalinden et al. |
| 2005/0010828 | A1 | 1/2005 | Oh |
| 2005/0215274 | A1 | 9/2005 | Matson et al. |
| 2005/0239518 | A1 | 10/2005 | D et al. |
| 2006/0212727 | A1 | 9/2006 | Judge et al. |
| 2007/0079160 | A1 | 4/2007 | Douniwa |
| 2007/0150759 | A1 | 6/2007 | Srinivasan et al. |
| 2008/0082319 | A1 | 4/2008 | Sebestian et al. |
| 2008/0082841 | A1 | 4/2008 | Juenemann et al. |
| 2008/0098245 | A1 | 4/2008 | Hogan et al. |
| 2008/0201716 | A1 | 8/2008 | Du et al. |
| 2008/0244227 | A1 | 10/2008 | Gee et al. |
| 2008/0307244 | A1 | 12/2008 | Bertelsen et al. |
| 2009/0089563 | A1 | 4/2009 | Cabillic et al. |
| 2009/0119495 | A1 | 5/2009 | Khatri |
| 2009/0144519 | A1 | 6/2009 | Codrescu et al. |
| 2009/0172438 | A1 | 7/2009 | Kumar et al. |
| 2009/0307696 | A1 | 12/2009 | Vals et al. |
| 2009/0307708 | A1 | 12/2009 | Archer et al. |
| 2009/0313492 | A1 | 12/2009 | Lerman et al. |
| 2010/0146513 | A1 | 6/2010 | Song |
| 2010/0153765 | A1 | 6/2010 | Stemen et al. |
| 2010/0251253 | A1 | 9/2010 | Pike |
| 2010/0273450 | A1 | 10/2010 | Papineau et al. |
| 2010/0275045 | A1 | 10/2010 | Qin et al. |
| 2010/0293401 | A1 | 11/2010 | De Cesare et al. |
| 2011/0022833 | A1 | 1/2011 | Nussbaum et al. |
| 2011/0029799 | A1 | 2/2011 | Walrath |
| 2011/0099747 | A1 | 5/2011 | Kim et al. |
| 2011/0191607 | A1 | 8/2011 | Gunther et al. |
| 2011/0264934 | A1 | 10/2011 | Branover et al. |
| 2012/0102344 | A1 | 4/2012 | Kocev et al. |
| 2012/0137155 | A1 | 5/2012 | Yoshida |
| 2012/0166779 | A1 | 6/2012 | Muralidhar et al. |
| 2014/0181560 | A1 | 6/2014 | Muralidhar et al. |
| 2014/0237279 | A1 | 8/2014 | Muralidhar et al. |

FOREIGN PATENT DOCUMENTS

| | | |
|---|---|---|
| CN | 101515976 A | 8/2009 |
| CN | 101517510 A | 8/2009 |
| EP | 0910015 A1 | 4/1999 |
| EP | 1589403 A2 | 10/2005 |
| JP | 2008107914 A | 5/2008 |
| JP | 2009223687 A | 10/2009 |
| JP | 2009223866 A | 10/2009 |
| JP | 2010097427 A | 4/2010 |
| KR | 100563691 B | 3/2006 |
| KR | 20090046841 A | 5/2009 |
| KR | 20100122875 A | 11/2010 |
| TW | 201022923 A | 6/2010 |
| TW | 201115325 A | 5/2011 |
| WO | 0115159 A1 | 3/2001 |
| WO | 2013049326 A2 | 4/2013 |
| WO | 2013049371 A2 | 4/2013 |

OTHER PUBLICATIONS

P47290in, allowed claims, dated Apr. 26, 2021.
Patent Grant Intimation P47290IN, dated Sep. 16, 2021.
Received Email Patent Certificate P47290IN, dated Sep. 1, 2021.
"New Intel atom Processor-Based Platform Using Significantly Lower Power Readies Intel for Smartphone, Tablet Push," News release, May 4, 2010, Intel Corporation, Santa Clara, CA.
Brown, "Suspend-to-RAM in Linux", Reprinted from the Proceedings for the Linux Symposium, Jul. 23-26, 2008, Ottawa, Ontario, Canada, 16 pages.
Brown, "Suspend-to-RAM-Linux," Reprinted from Proceedings for the Linux Symposium, Jul. 23-26, 2008, Ottawa, Ontario, Canada, 16 pages.
Examination report received for Indian Patent Application No. 5444/CHE/2012, dated Jan. 29, 2019, 6 pages.
Extended European Search Report received for European Patent Application No. 12836731.5, dated Apr. 8, 2015.
Intel Corporation "New Intel atom Processor-Based Platform Using Significantly Lower Power Readies Intel for Smartphone, Tablet Push", News Release, May 4, 2010, 2 pages, Santa Clara, CA.
Intel Corporation, "New Intel atom Processor-Based Platform Using Significantly Lower Power Readies Intel for Smartphone, Table Push," News Release, May 4, 2010, 2 pages, Santa Clara, CA.
International Preliminary Report on Patentability and Written Opinion received for PCT Patent Application No. PCT/US2012/057597, dated Apr. 10, 2014, 6 pages.
International Preliminary Report on Patentability and Written Opinion received for PCT Patent Application No. PCT/US2012/057525, dated Apr. 10, 2014, 6 pages.
International Preliminary Report on Patentability received for International Patent Application No. PCT/US2011/063485, dated Jun. 25, 2013, 5 pages.
International Search Report and Written Opinion received for International Patent Application No. PCT/US2011/063485, dated Jun. 28, 2012.
International Search Report and Written Opinion received for International Patent Application No. PCT/US2011/063907, dated Jun. 26, 2012, 8 pages.
International Search Report and Written Opinion received for PCT Patent Application No. PCT/US2012/057525 dated Mar. 18, 2013, 9 pages.
International Search Report and Written Opinion received for PCT Patent Application No. PCT/US2012/057597, dated Mar. 25, 2013, 9 pages.
Mudigonda, J. et al., "Using Asymmetric Single-ISA CMP's to Save Energy on Operating Systems," IEEE Micro Magazine, IEEE Computer Society, vol. 28, No. 3, May-Jun. 2008, pp. 26-41.
Non-Final Rejection issued in U.S. Appl. No. 13/075,057, dated Sep. 19, 2013, 10 pages.
Non-Final Rejection issued in U.S. Appl. No. 13/077,882, dated Jan. 11, 2013, 12 pages.
Notice of Allowance issued in U.S. Appl. No. 13/075,057, dated Feb. 27, 2014, 7 pages.
Notice of Allowance issued in U.S. Appl. No. 13/077,882, dated Jul. 29, 2013, 6 pages.
Notice of Allowance received for Korean Patent Application No. 10-2014-7008090, dated Nov. 25, 2015, 3 pages including 1 page of English translation.
Notice of Allowance received for Korean patent Application No. 10-2014-7008097, dated Nov. 18, 2015, 3 pages including 1 page of English translation.

(56) References Cited

OTHER PUBLICATIONS

Notice of Allowance received for Taiwan Patent Application No. 101135104, dated Jun. 27, 2014, 2 pages of English Translation and 1 page of Notice of Allowance.
Notice of Allowance received for U.S. Appl. No. 14/139,864, dated Feb. 16, 2018, 5 pages.
Office Action received for Chinese Patent Application No. 201280047606.X, dated Aug. 27, 2015, 13 pages.
Office Action received for Chinese Patent Application No. 201280047653.4, dated Sep. 2, 2015, 28 pages including 16 pages of English translation.
Office Action received for Japanese Patent Application No. 2014-530976, dated Apr. 21, 2015, 7 pages including 3 pages of English translation.
Office Action received for Japanese Patent Application No. 2014-530976, dated Aug. 18, 2015, 9 pages including 5 pages of English translation.
Office Action received for Japanese Patent Application No. 2014-532120, dated Apr. 28, 2015, 10 pages including 5 pages of English translation.
Office Action received for Japanese Patent Application No. 2014-532120, dated Nov. 17, 2015, 3 pages including 1 page of English translation.
Office Action received for Korean Patent Application No. 2014-7008090, dated Aug. 17, 2015, 6 pages including 2 pages of English translation.
Office Action received for Korean Patent Application No. 2014-7008097, dated Aug. 26, 2015, 9 pages including 4 pages of English translation.
Office Action received for U.S. Appl. No. 14/139,864, dated Jan. 29, 2016 10 pages.
Office Action received for U.S. Appl. No. 14/139,864, dated Mar. 31, 2017, 10 pages.
Office Action received for U.S. Appl. No. 14/139,864, dated Oct. 19, 2017, 11 pages.
Office Action received for U.S. Appl. No. 14/139,864, dated Sep. 19, 2016, 11 pages.
Partial Supplementary European Search Report received for European Patent Application No. 12837567.2, dated Nov. 3, 2015.
Shimpi, Anand L., "OS Driven Power Management, Intel Unveils Moorestown and the Atom Z600, The Fastest Smartphone Platform?," AnandTech, http://www.anandtech.com/show/3696/intel-unveils-moorestown-and-the-atom-z600-series-the-fastest-smartphone-processor/11, May 4, 2010.
Shimpi, Anand L., "Power Gating, Intel Unveils Morestown and the Atom Z600, The Fastest Smartphone Platform?," nttp://www.anandtech.com/show/3696/intel-unveils-moorestown-and-the-atom-z600-series-the-fastest-smartphone-processor/10, AnandTech, May 4, 2010.

\* cited by examiner

PLATFORM POWER CONSUMPTION REDUCTION VIA POWER STATE SWITCHING

FIELD

The present disclosure generally relates to the field of electronics. More particularly, an embodiment of the invention relates to platform power consumption reduction via power state switching.

BACKGROUND

To reduce power consumption, some systems include processors with the ability to perform at various low power (Cx) states. Each C state may indicate a certain level of functionality and corresponding power state. For example, C0 may indicate the processor is operating at normal levels, C1 may indicate the processor is not executing instructions but may return to an executing state quickly, C2 may indicate the processor is to maintain all software-visible information but may take longer to return to full executing state, C3 may indicate the processor is asleep but keeps its cache coherent, C6 may indicate much deeper sleep state where caches are flushed, etc.

However, support for aggressive Operating System (OS) or Software (SW) driven power management is generally very minimal, especially from an OS perspective. Moreover, most current OS power management strategies tend not to scale very well with multiple core systems from a processor power management perspective, or the platform as a whole.

Accordingly, how the various power consumption states are utilized may have a direct impact on performance and/or power consumption of a processor.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
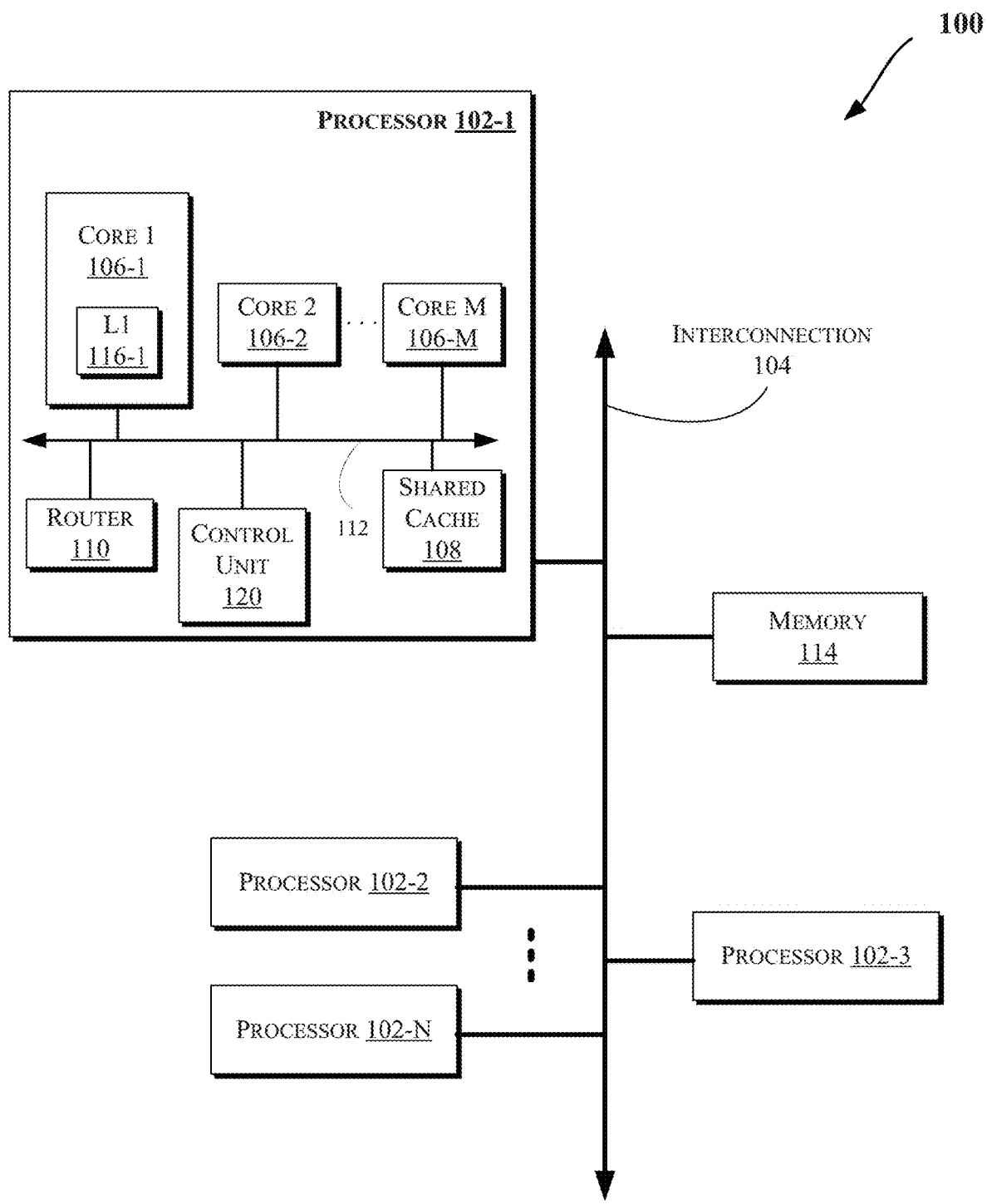
FIGS. 1, 9, and 10 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof. Also, the use of "instruction" and "microoperation" (uop) is interchangeable as discussed herein.

Power management is crucial for mobile devices (such as phones, tablets, UMPC (Ultra-Mobile Personal Computer), laptop computers, etc.) and hence it is critical that such platforms are highly optimized from a power and performance point of view. To this end, some embodiments provide power consumption reduction (e.g., in System on Chip (SOC) platforms) via power state switching. Generally, an SOC refers to an integrated circuit chip or die that includes/integrates various components (such as one or more components discussed herein with reference to the figures, such as one or more of: processor core(s), memory, networking logic, etc.) to provide a system. For example, battery life of SOCs (e.g., running the Android™ OS or other operating systems used in mobile devices) may be increased through dynamic power state switching. In an embodiment, the power state of a device is dynamically switched between S0ix and S3 during run-time.

Generally, "S0ix" refers to improved idle power state(s) achieved by platform-level power management that is event driven (e.g., based on OS or software application input) instead of traditional idle power state that is driven either by a user or based on a determination that a platform has been idle for too long (based on a pre-programmed time). In some embodiments, at least some of the power consumption states discussed herein may be in accordance with or similar to those defined under Advanced Configuration and Power Interface (ACPI) specification, Revision 5, December 2011. As discussed herein, "S3" generally refers to a power state such as standby, sleep, and/or suspend to Random Access Memory (RAM), e.g., while the RAM remains powered to maintain data correctness.

In one embodiment, a processor includes logic (such as logic 120 discussed with reference to the figures herein) to control which specific processor core(s) are to change power states based, at least in part, on input from OS software and/or software application(s). Moreover, the ability to control the level of power states may be used to optimize platform power consumption in response to various determinations such as based on the workload, scenario, usage, etc. Furthermore, at least some OS operations discussed herein may be interchangeably performed by software applications, firmware, etc.

The techniques discussed herein may be used in any type of a processor with performance state settings, such as the processors discussed with reference to FIGS. 1 and 9-10. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, a router 110, and/or a processor control logic or unit 120. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 9-10), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, the control unit 120 controls which specific processor core(s) are to change power states (e.g., between S3 and S0ix states) based, at least in part, on input from OS software and/or software application(s) (e.g., that may be stored in the memory 114). Moreover, the ability to control the level of power states may be used to optimize platform power consumption in response to various determinations such as based on the workload, scenario, usage, etc. Furthermore, at least some OS operations discussed herein may be interchangeably performed by software applications, firmware, etc.

Figure 2:
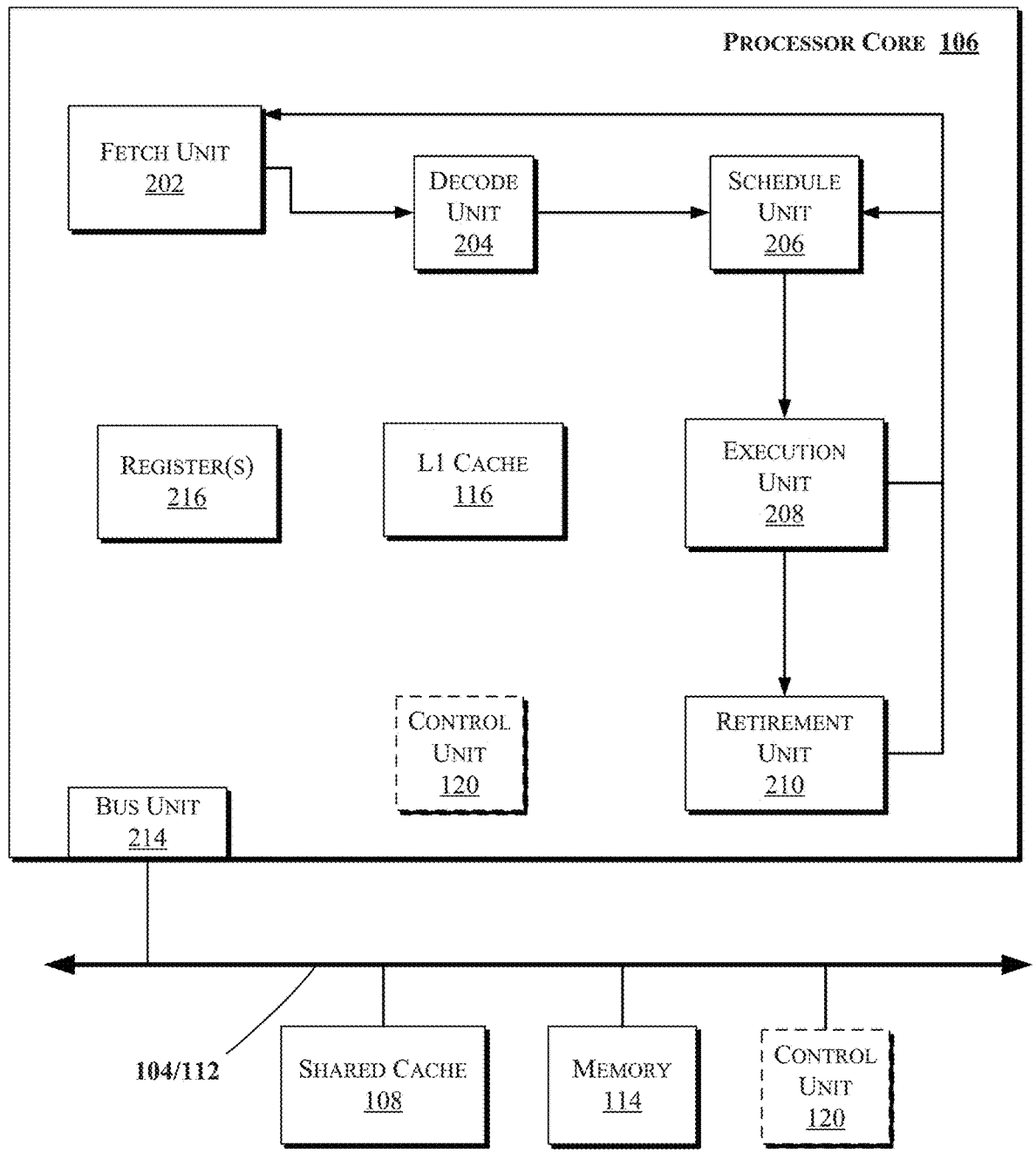
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 9-10. The core 106 may also include a decode unit 204 to decode the fetched instruction. For instance, the decode unit 204 may decode the fetched instruction into a plurality of uops (micro-operations).

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to power consumption state settings).

Furthermore, even though FIG. 1 illustrates the control unit 120 to be coupled to the core 106 via interconnect 112, in various embodiments the control unit 120 may be located elsewhere such as inside the core 106, coupled to the core via bus 104, etc.

Figure 3:
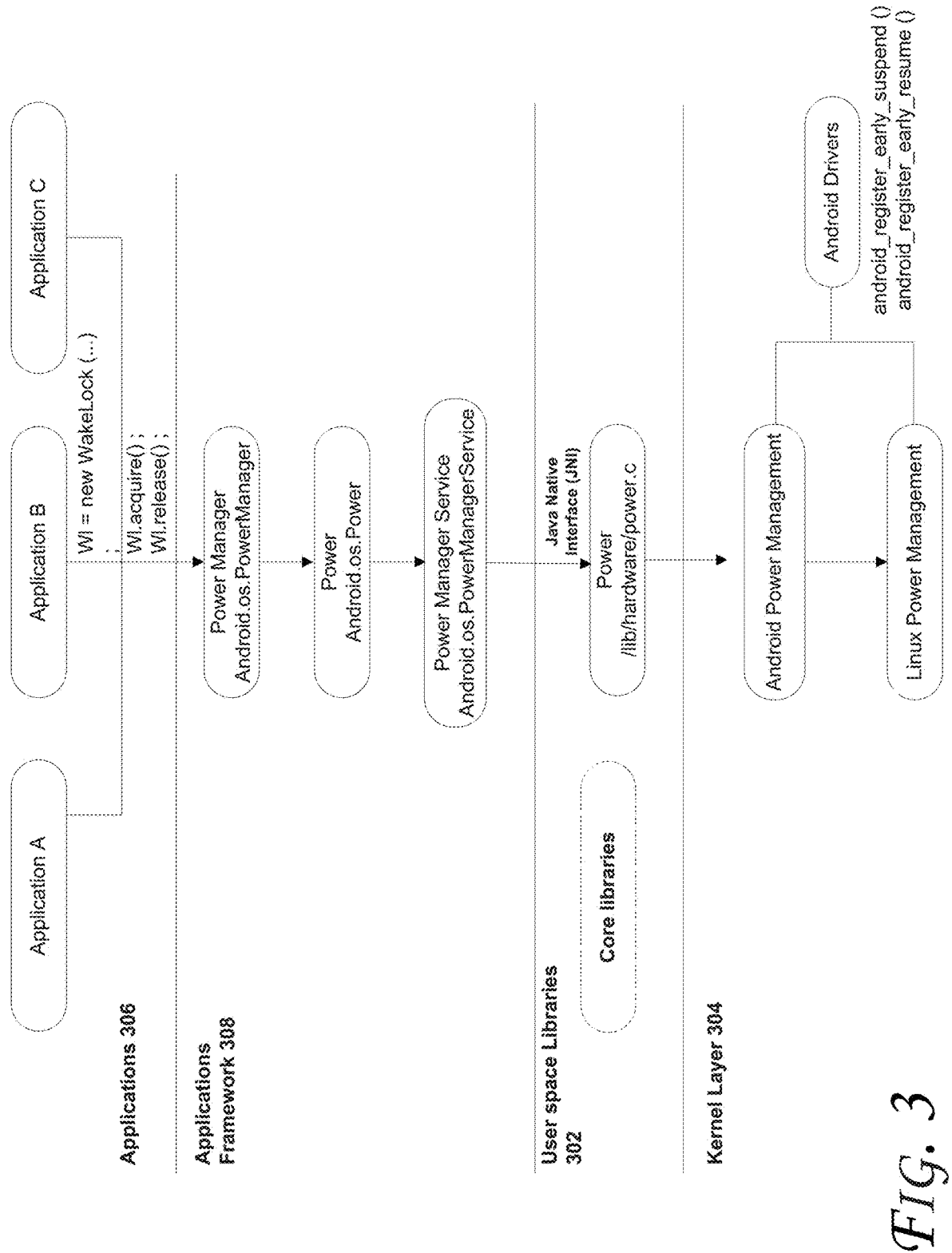
FIG. 3 illustrates a block diagram of power management architecture for an Android based system that may be used to implement one or more embodiments discussed herein.

FIG. 3 illustrates a block diagram of power management architecture for an Android based system that may be used to implement one or more embodiments discussed herein. More specifically, the Android power management infrastructure is split across the User space 302 and Kernel layer 304. Wake locks may form a critical part of the framework. A "Wake Lock" can be defined as request by the application(s) 306 and/or service(s) to request one or more of the platform resources (such as CPU (Central Processing Unit—also referred to herein interchangeably as "processor"), display, etc.), e.g., to stay powered on or awake (hence, a "wake lock" may also be referred to herein interchangeably as a "awake request").

The Android Framework exposes power management to services and/or applications through a Power Manager class. All calls for Power Management go through the Android runtime Power Manager API (Application Programming Interface) to acquire and release wake locks. Kernel drivers may register with the Android Power Manager driver so that they are notified immediately prior to power down or after power up—drivers can register early_suspend( ) and late_resume( ) handlers, which are called when the display power state changes. The Android OS currently supports only suspend to RAM (a.k.a., S3) state (e.g., while power is supplied to RAM to maintain data correctness). This builds upon the traditional Linux® power management infrastructure and uses concepts of wake locks (i.e., application hints about platform resource usage) to achieve S3. The power management infrastructure in Android requires that applications and services request CPU resources with "wake locks" through the Android application framework 308 and/or native Linux libraries. If there are no active wake locks, Android will suspend the system to S3.

While the current S3 implementation in Android helps reduce overall platform power, this does not satisfy applications that require always connected behavior. Applications like instant messengers, VoIP (Voice over Internet Protocol), etc. need to send "keep alive" messages to maintain their active sessions. Entering S3 will result in freezing these applications and therefore connections can timeout and the sessions will have to be re-established on resume. To keep these applications active and still achieve reasonable power numbers, S0ix or Active Idle states feature (also known as Connected Standby in recent Intel®-based Microsoft Windows® platforms) can be used from the platform perspective in some embodiments. As discussed herein, S0ix and Active Idle states are used interchangeably.

Some embodiments use S0ix during an idle window to allow the platform to stay in the lowest power state as long as reasonably possible. In this state, all platform components are transitioned to an appropriate lower power state (e.g., CPU is in Cx state, memory is in Self Refresh, other components are clock or power gated, etc.) in accordance with an embodiment. As soon a timer or wake event occurs, the platform moves into an "Active" state (e.g., only the components that are needed are turned on, keeping everything else still in low power state). Hence, on true idleness, CPU C-states may be extended to devices, and the rest of the platform, e.g., pushing the platform aggressively to S0ix states.

Figure 4:
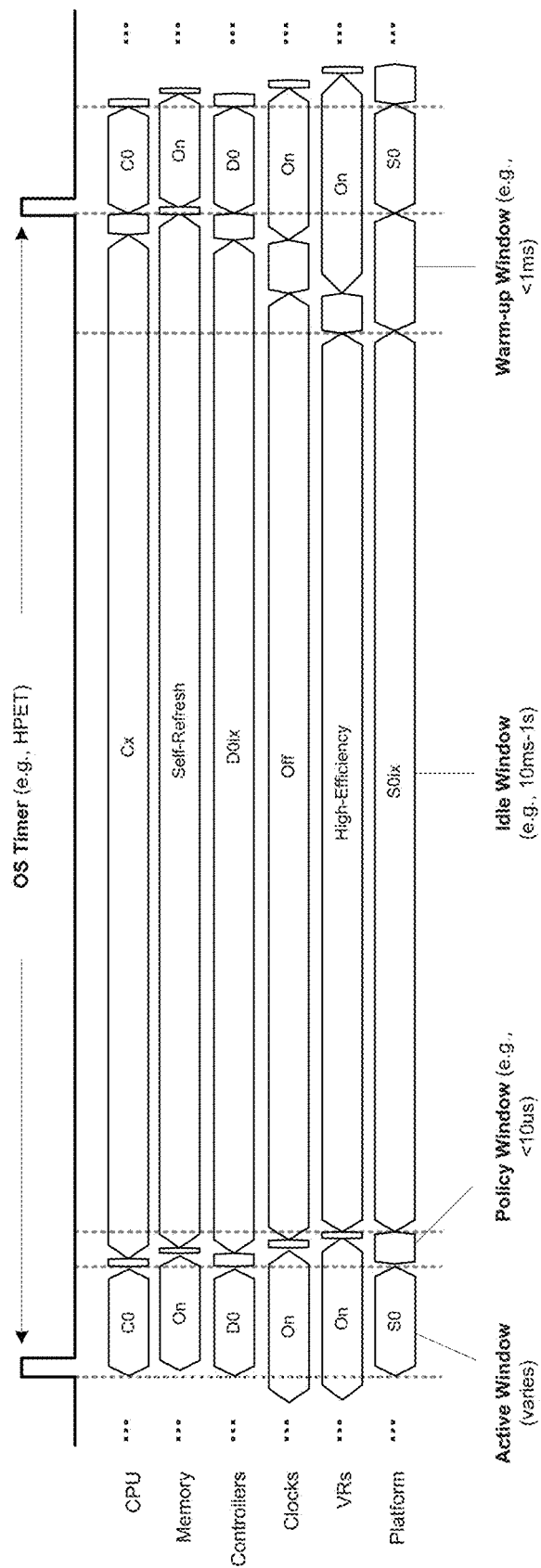
FIG. 4 illustrates a timing diagram according to an embodiment.

Referring to FIG. 4, a timing diagram is shown for aligning platform power states with CPU during device idleness at S0ix, according to an embodiment. As shown, various components such as memory, controllers, clocks, Voltage Regulator(s) (VRs), and other platform components are aligned during an idle window with the CPU, e.g., based on an OS timer (e.g., HPET (High Performance Event Timer)) after some active window, followed by an optional policy windows. Once the idle window ends, and after an optional warm-up window, the active state resumes.

Figure 5:
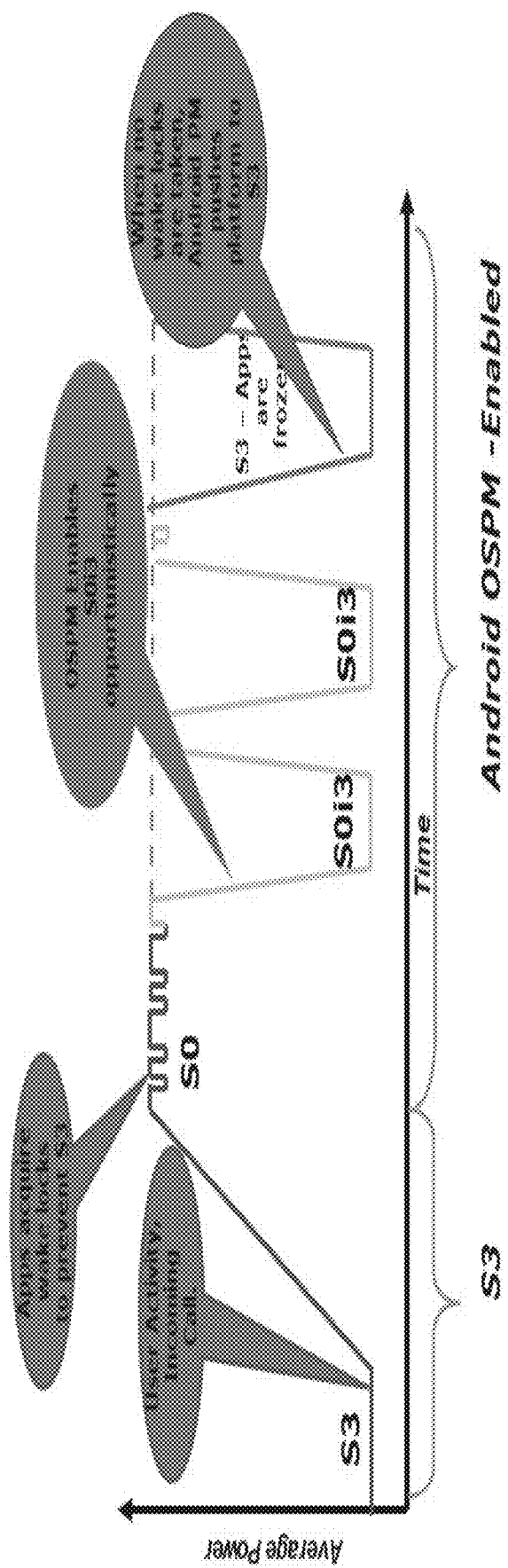
FIGS. 5, 6, and 7 illustrate various graphs according to some embodiments.

FIG. 5 is a graph of average power versus time illustrating comparison of how S0ix states impact platform power states, according to an embodiment. More specifically, FIG. 5 illustrates how the impact of S0ix states compares with traditional (e.g., ACPI-based) power management. As shown, even after applications acquire wake locks to prevent S3, OS Power Management (OSPM) driver may still opportunistically cause initiation of S0i3 (which may be more generally referred to herein as S0ix), which may transition afterwards to S3, e.g., when no wake locks remain.

In some implementations, the OS for a smart phone or tablet may implement both S0ix and S3. S0ix may be used in very specific scenarios like low power audio playback (where the entire platform except the audio cluster can be put into a low power mode), or display self-refresh (where only the display panel can be kept on, and entire SOC can be put into lowest possible power state). S0ix has very low entry/exit latencies at about 2 ms, whereas S3 entry/exit latencies range in the order of 100s of milliseconds (since devices must be suspended, applications must be frozen, etc.). For example, in idle scenarios, when the phone is in idle standby with 3G and/or WLAN (Wireless Local Area Network) connected, the platform power can still be around 14 mW on some Android based phones.

Ideally, there should be no wakes on the platform that can cause the phone to exit out of S3 state and into S0 state (where S0 refers to the operating/working state). However, in real usage scenarios, there may be a lot of wakes that happen when background data is enabled on a real network. Most of these wakes may be due to applications waking the platform (such as maps, Google® GSF (Google Services Framework), etc.) or applications performing push from network (such as Google+™, etc.). These wakes could happen every 30 sec (e.g., as seen on real live network with WIFI (Wireless Fidelity) on).

To this end, some embodiments reduce platform power consumption by aggressively invoking and maintaining S0ix state in mobile devices (such as phones, tablets, UMPC (Ultra-Mobile Personal Computer), laptop computers, etc.). Moreover, entering/exiting S3 too frequently may not always provide a net power benefit, e.g., due to the fact that S3 can have higher transition cost of doing full suspend/resume (around 2 seconds) as compared to S0i3 (around 2 ms). In fact, in some situations, entering/exiting S3 too frequently can actually hurt, leading to a higher consumption when selecting S3 if there are frequent wakes happening on the platform. In such scenarios, state S0ix is entered rather than S3 in an embodiment (even if Android power management attempts to enter S3).

In some implementations, there may be periodic events due to different applications (such as Google Services, Google Sync, Maps, etc.) that cause the platform to wake up periodically from standby (or S3). For example, some phones may wake up as many as 250 times in an hour (i.e., 4 wakes a minute, or one every 15 seconds). However, as the number of wakes increases, entering S0i3 instead of S3 becomes more and more beneficial. This is illustrated in FIG. 6 which shows platform current draw (in mA) versus the number of wakes (e.g., per second) changes for S0i3/S3 threshold on a sample platform, according to some embodiments.

Figure 6:
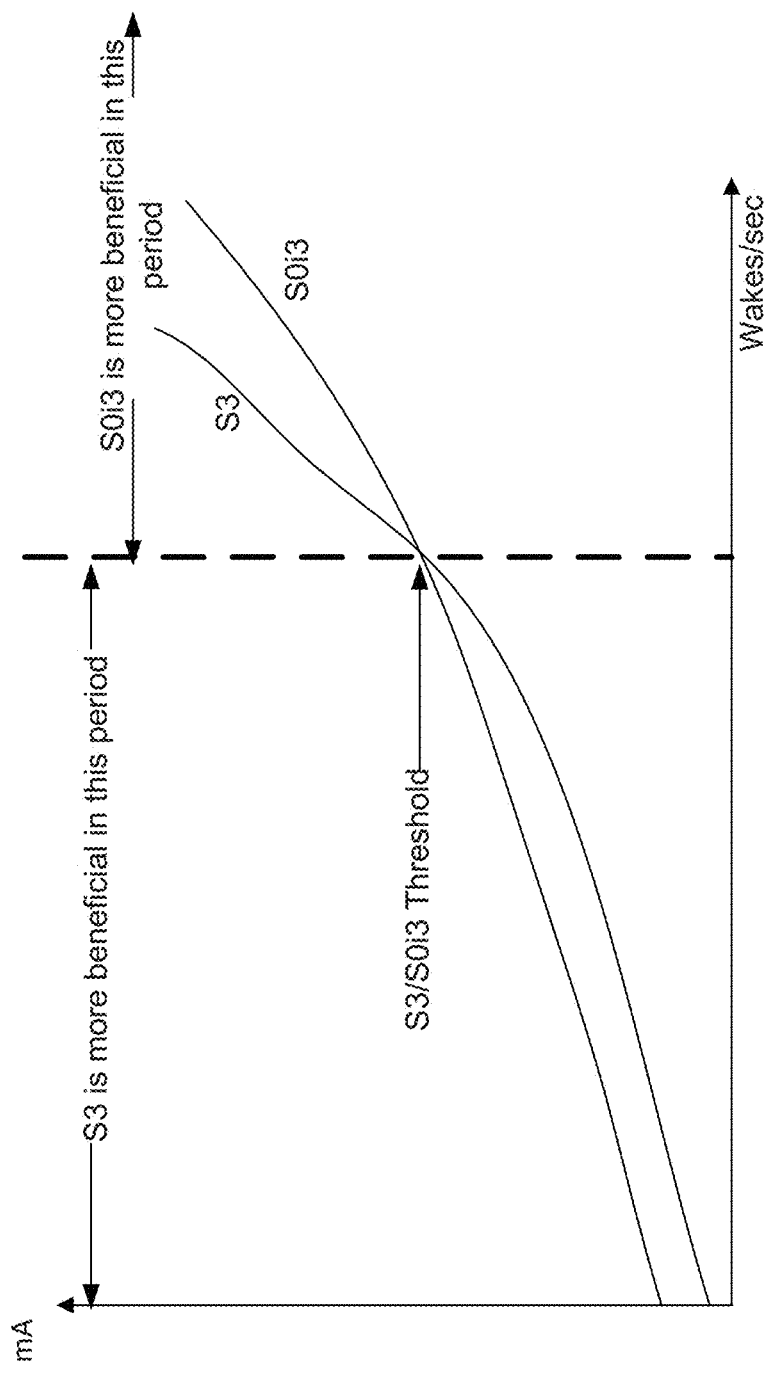

As shown in FIG. 6, there is a threshold point (a threshold number of wakes per second) at which S0ix becomes more beneficial than S3 for the platform in terms of power consumption. As can be seen, the higher the number of wakes on the platform, the more beneficial it is to do S0i3 instead of S3. This can sometimes allow for 50% to 60% gain in standby battery life.

Figure 7:
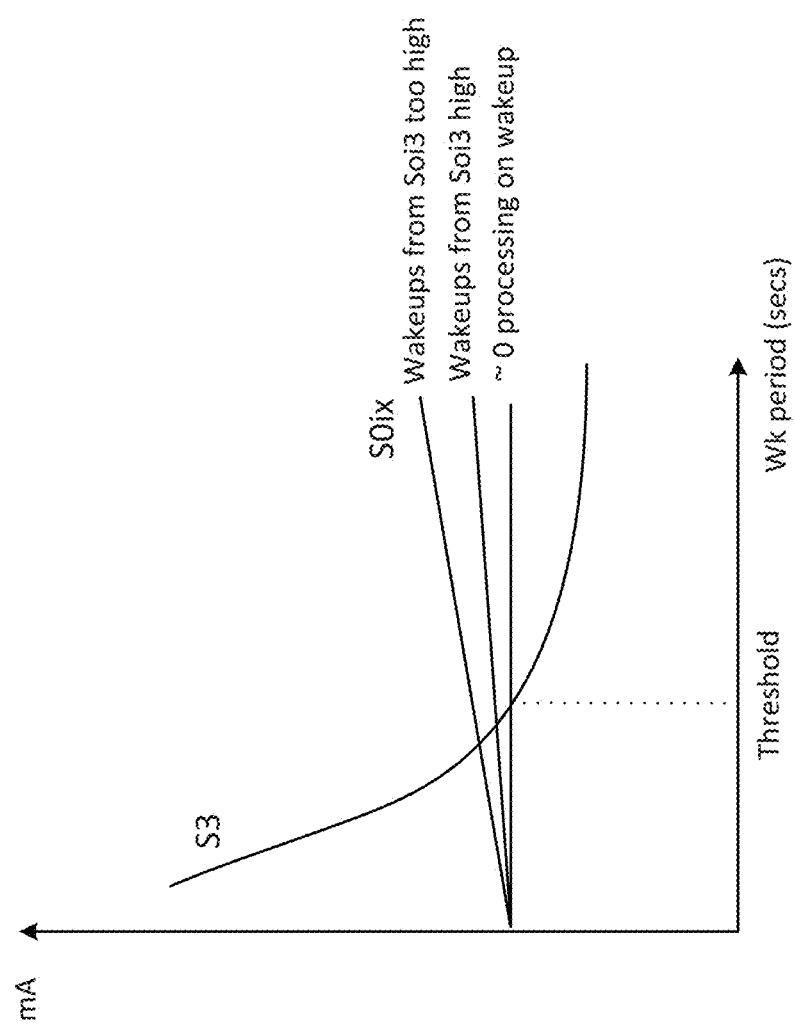

Referring to FIG. 7, a graph of the average power consumption (e.g., in mA) of S0ix/S3 plotted against the frequency of wakes on the platform is illustrated, according to an embodiment. Based on the entry/exit latency values of S0ix and S3, it can be seen that there is a threshold where there is benefit in picking low-latency S0ix rather than S3.

In some embodiments, the power characterization of S3 profiling is giving by the following formula:

$$E_{S3}(T_{th}) = \overline{U} \cdot \overline{I}_{ST} \cdot T_{S3} + \overline{U} \cdot \overline{I}_{S3} \cdot (T_{th} - T_{S3}) \qquad (1)$$

where:

$E_{S3}$ is defined as the average of power consumption during period $T_{th}$;

$T_{th}$ is defined as the cross—point between S3 and S0i3 curves given above;

$\overline{I}_{ST}$ is defined as the average of current consumption during a suspend/resume transition;

$T_{S3}$ is defined as the delay required for the device to go through the whole suspend patch; and $\overline{I}_{S3}$ is defined as the average of power consumption in S3.

Also, the power characterization of S0i3 profiling is giving by the following formula in accordance with some embodiments:

$$E_{S0i3}(T_{th}) = \overline{U} \cdot \overline{I}_{S0i3} \cdot T_{th} \quad (2)$$

where:

$E_{S0i3}$ is defined as the power consumption during $T_{th}$; and $I_{S0i3}$ is defined as the current consumption in S0i3.

Matching the two formulae (1 and 2) given above, may be determined as:

$$T_{th} = \overline{T}_{S3} \times \frac{\overline{I}_{ST} - \overline{I}_{S3}}{\overline{I}_{S0i3} - \overline{I}_{S3}}$$

In accordance with some embodiments, if the next wake is beyond about a 60 second window (e.g., as determined as per the calculation above), it is beneficial to enter S3 state; whereas, if the next wake is within about 60 seconds, picking S0i3 state is most beneficial from a power consumption point of view.

Figure 8:
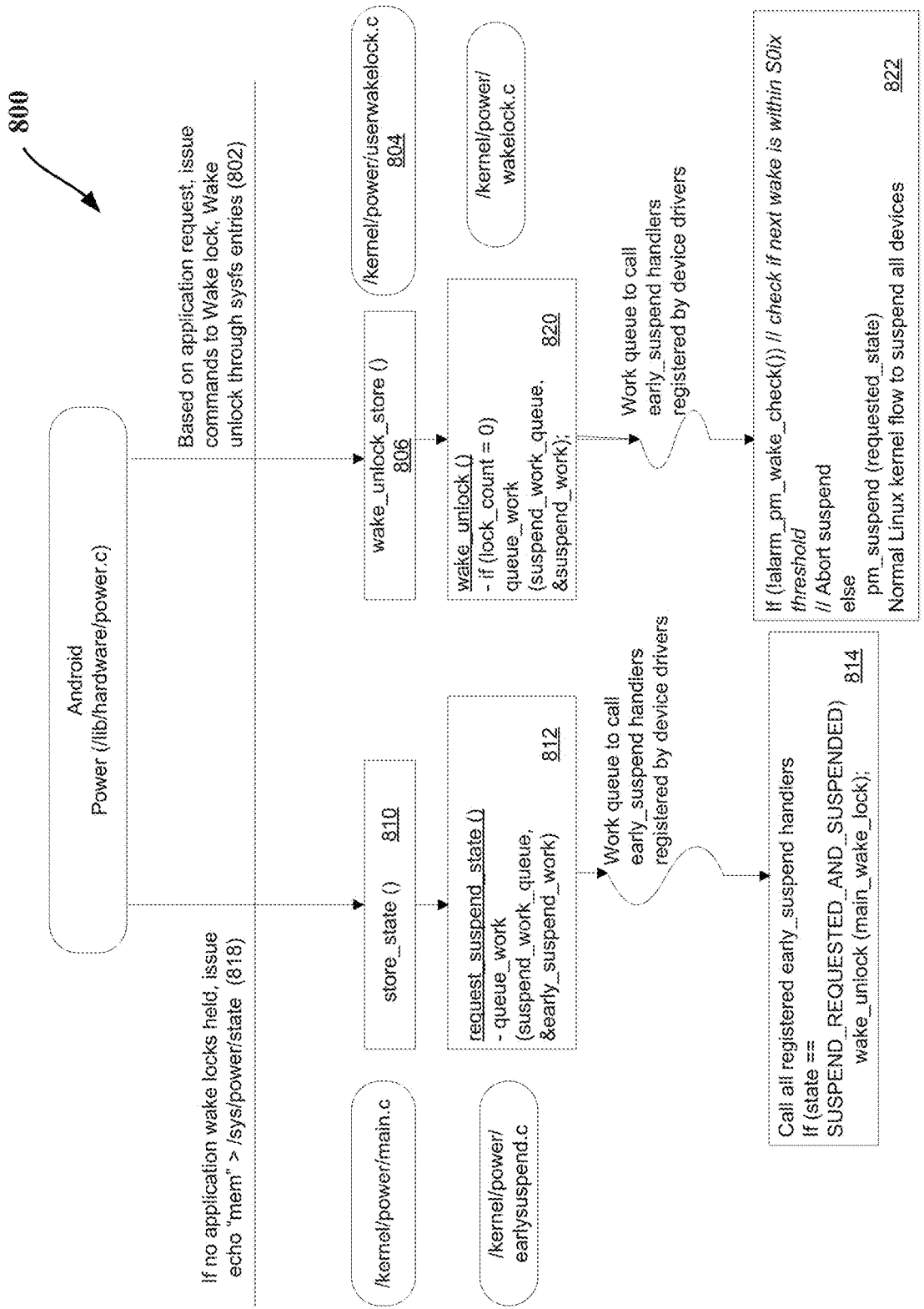
FIG. 8 illustrates a suspend flow to dynamically choose power states, according to an embodiment.

FIG. 8 illustrates a sample suspend flow 800 (e.g., for an Android OS) according to an embodiment. Flow 800 is used to dynamically choose S0ix versus S3 in some embodiments. In some embodiments, various components discussed with reference to FIGS. 1-7 and 9-10 may be utilized to perform one or more of the operations discussed with reference to FIG. 8. For example, the control unit 120 may be used to control power consumption states of one or more processor cores 106 and/or perform one or more of the operations discussed with reference to flow 800.

As illustrated, whenever a wake lock is taken or released 802, the kernel interface 804 for grabbing a wake lock is accessed at 806. The user mode policy manager for Android will know what locks are held and when there are no full wake locks the power management service will inform the kernel to turn off the display by accessing the /sys/power/state interface, by writing "mem" to it. To turn on the display, the PM (Power Management) service writes "on" to /sys/power/state. This is illustrated in FIG. 8. As it can be seen, there are two main kernel work queues: (1) early suspend work queue (shown on the left portion of the figure including 810-814): this is invoked from the main kernel path when "mem" is written into /sys/power/state at 818 (this work queue is responsible for calling all drivers that have registered early_suspend notifiers); and (2) suspend work queue (shown on the right portion of the figure including 806 and 820-822): when there are no wake locks held in the platform, this work queue finally freezes application processes, and invokes the pm_suspend path in the kernel.

Moreover, early suspend happens when the user mode writes "mem" to /sys/power/state at 818. For example, whenever the user mode turns off the screen, the registered early suspend callbacks are called at 812. The kernel keeps a list of wake_locks held. When the wake lock list transitions from non-empty to empty pm_suspend is called at 822. This is a Linux platform state where all applications are frozen, drivers have their suspend entry points called, and interrupts are turned off. The platform will not exit this state except on external event, e.g., GPIO (General Purpose Input/Output), interrupt generated from an RTC (Real Time Clock), or an external interrupt (an incoming call for example). All non-wake-up hardware is expected to enter its lowest power state to reduce power consumption. Hardware that can generate a wake up interrupt is expected to go into a low power mode as well, but still function enough to wake the system out of the suspend state.

Some embodiments are implemented within the Android power management infrastructure, and more specifically within the Linux Kernel. For example, at operation 822, a new embodiment is provided to extend the functionality of an alarm driver to expose information of when the next alarm is expected to be triggered. This newly added function is used by a PMU (Power Management Unit) driver, e.g., along with a programmed threshold value, to determine if the platform should enter S0ix or S3. In this way, a suspend is authorized only when the next alarm expiry is higher than the break event. The updated kernel PM suspend path (as shown in FIG. 8) is able to dynamically pick S0ix or S3 depending on a tunable parameter (which may be set at boot time or run time in various embodiments).

Figure 9:
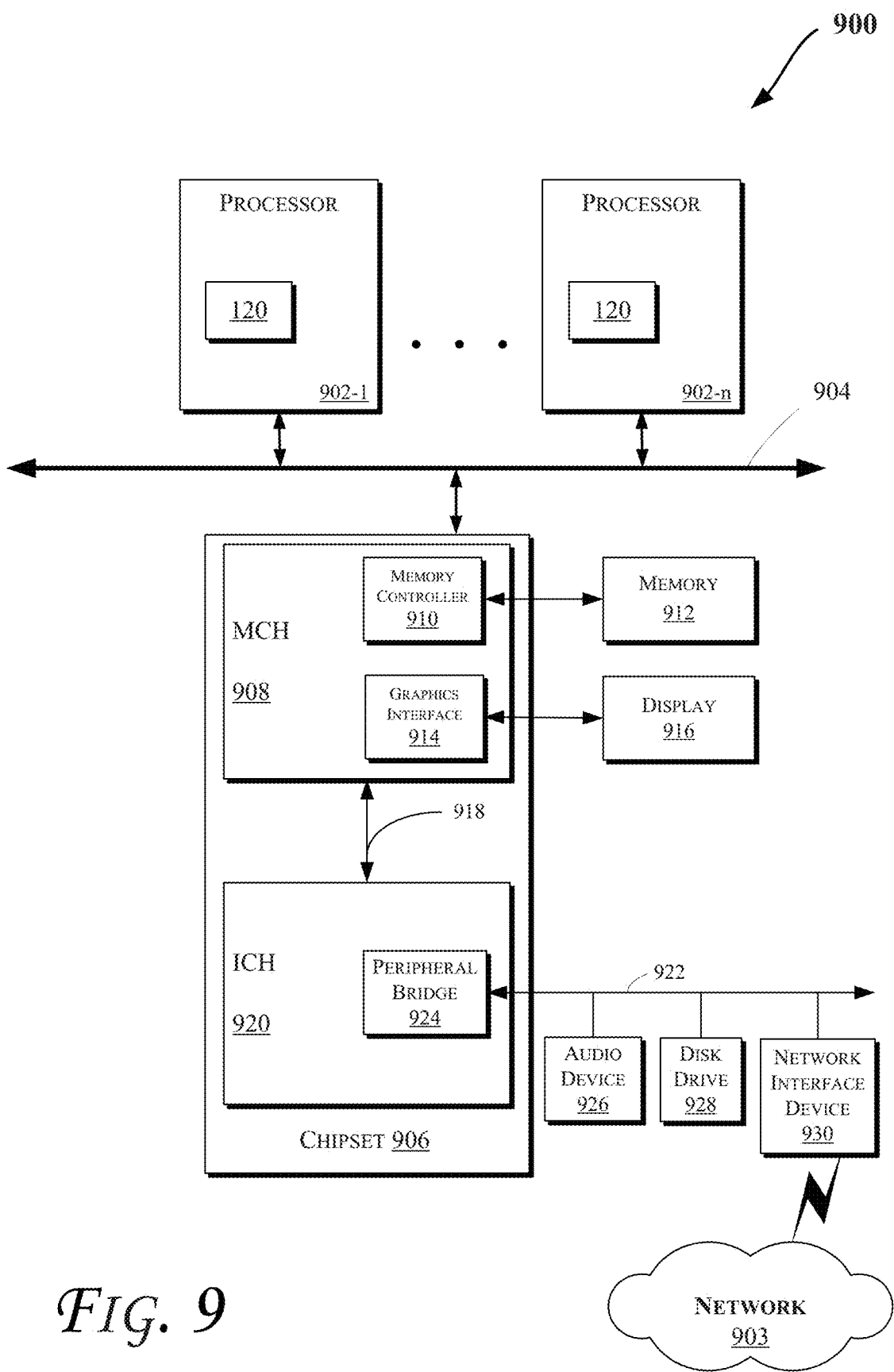

FIG. 9 illustrates a block diagram of a computing system 900 in accordance with an embodiment of the invention. The computing system 900 may include one or more central processing unit(s) (CPUs) 902 or processors that communicate via an interconnection network (or bus) 904. The processors 902 may include a general purpose processor, a network processor (that processes data communicated over a computer network 903), or other types of a processor (including a reduced instruction set computer (RISC) processor or a complex instruction set computer (CISC)). Moreover, the processors 902 may have a single or multiple core design. The processors 902 with a multiple core design may integrate different types of processor cores on the same integrated circuit (IC) die. Also, the processors 902 with a multiple core design may be implemented as symmetrical or asymmetrical multiprocessors. In an embodiment, one or more of the processors 902 may be the same or similar to the processors 102 of FIG. 1. For example, one or more of the processors 902 may include the control unit 120 discussed with reference to FIGS. 1-8. Also, the operations discussed with reference to FIGS. 1-8 may be performed by one or more components of the system 900.

A chipset 906 may also communicate with the interconnection network 904. The chipset 906 may include a memory control hub (MCH) 908. The MCH 908 may include a memory controller 910 that communicates with a memory 912 (which may be the same or similar to the memory 114 of FIG. 1). The memory 912 may store data, including sequences of instructions, that may be executed by the CPU 902, or any other device included in the computing system 900. In one embodiment of the invention, the memory 912 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 904, such as multiple CPUs and/or multiple system memories.

The MCH 908 may also include a graphics interface 914 that communicates with a display device 916. In one embodiment of the invention, the graphics interface 914 may communicate with the display device 916 via an accelerated graphics port (AGP). In an embodiment of the invention, the display 916 (such as a flat panel display) may communicate with the graphics interface 914 through, for example, a signal converter that translates a digital representation of an image stored in a storage device such as video memory or system memory into display signals that are interpreted and displayed by the display 916. The display signals produced by the display device may pass through various control devices before being interpreted by and subsequently displayed on the display 916.

A hub interface 918 may allow the MCH 908 and an input/output control hub (ICH) 920 to communicate. The ICH 920 may provide an interface to I/O device(s) that communicate with the computing system 900. The ICH 920 may communicate with a bus 922 through a peripheral bridge (or controller) 924, such as a peripheral component interconnect (PCI) bridge, a universal serial bus (USB) controller, or other types of peripheral bridges or controllers. The bridge 924 may provide a data path between the CPU 902 and peripheral devices. Other types of topologies may be utilized. Also, multiple buses may communicate with the ICH 920, e.g., through multiple bridges or controllers. Moreover, other peripherals in communication with the ICH 920 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 922 may communicate with an audio device 926, one or more disk drive(s) 928, and a network interface device 930 (which is in communication with the computer network 903). Other devices may communicate via the bus 922. Also, various components (such as the network interface device 930) may communicate with the MCH 908 in some embodiments of the invention. In addition, the processor 902 and the MCH 908 may be combined to form a single chip. Furthermore, the graphics accelerator 916 may be included within the MCH 908 in other embodiments of the invention.

Furthermore, the computing system 900 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 928), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 10:
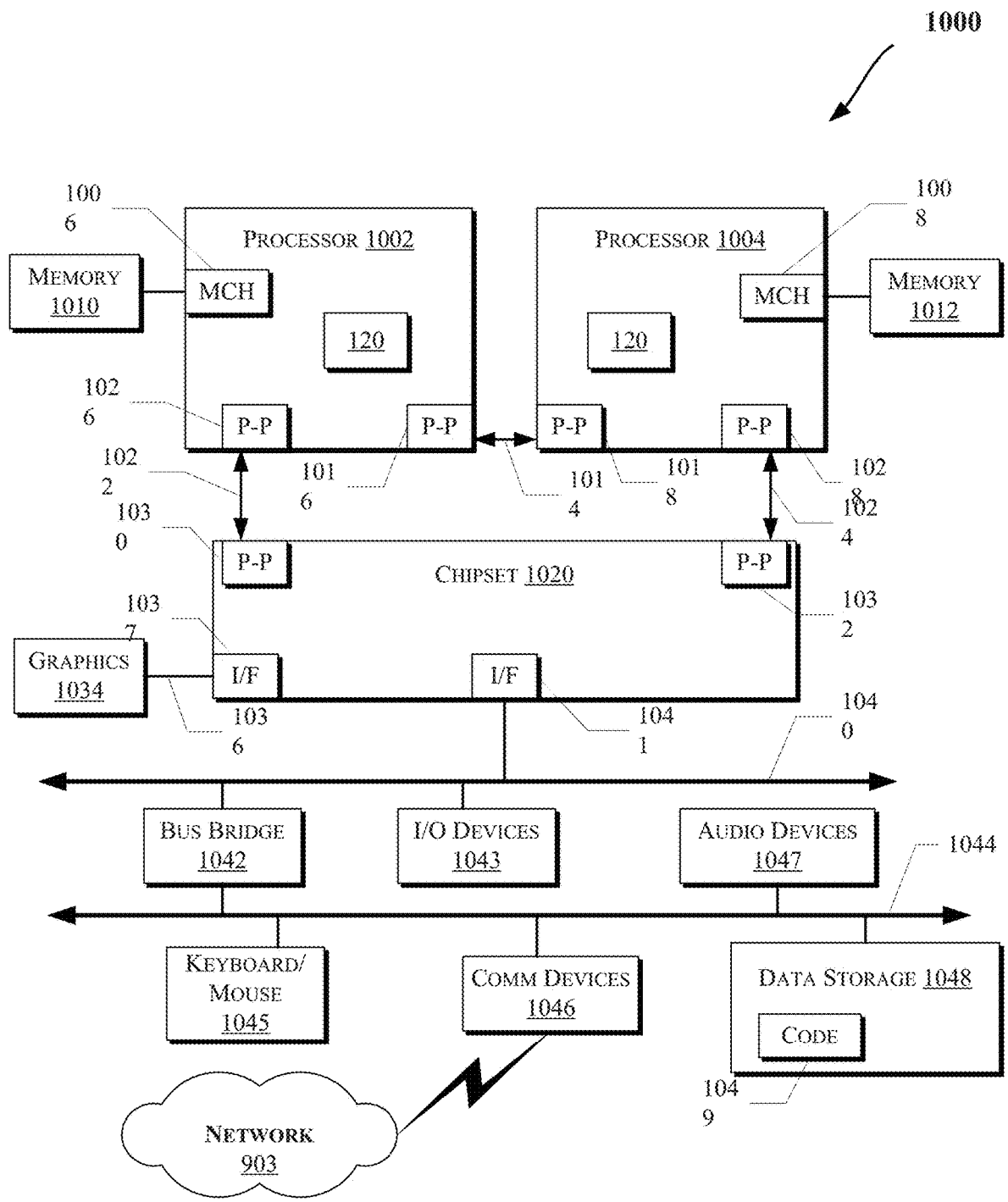

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIGS. 1-9 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. The memories 1010 and/or 1012 may store various data such as those discussed with reference to the memory 912 of FIG. 9.

In an embodiment, the processors 1002 and 1004 may be one of the processors 902 discussed with reference to FIG. 9. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a graphics circuit 1034 via a graphics interface 1036, e.g., using a PtP interface circuit 1037.

At least one embodiment of the invention may be provided within the processors 1002 and 1004. For example, the control unit 120 of FIGS. 1-9 may be located within the processors 1002 and 1004. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may communicate with a bus 1040 using a PtP interface circuit 1041. The bus 1040 may communicate with one or more devices, such as a bus bridge 1042 and I/O devices 1043. Via a bus 1044, the bus bridge 1042 may communicate with other devices such as a keyboard/mouse 1045, communication devices 1046 (such as modems, network interface devices, or other communication devices that may communicate with the computer network 903), audio I/O device 1047, and/or a data storage device 1048. The data storage device 1048 may store code 1049 that may be executed by the processors 1002 and/or 1004.

In various embodiments of the invention, the operations discussed herein, e.g., with reference to FIGS. 1-10, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-10.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
control logic, the control logic at least partially comprising hardware logic, to cause a processor to enter a first low power consumption state instead of a second low power consumption state based on a threshold time period between a first wake event and a second wake event,
wherein the first low power consumption state is to consume more power than the second low power consumption state, wherein the first wake event or the second wake event are to each correspond to one of a plurality of awake requests, wherein the control logic is to determine whether the processor is to enter the first low power consumption state based at least in part on a scenario and one of the plurality of awake requests, wherein at least one of the plurality of awake requests are to cause prevention of entry into the second low power consumption state by the processor for as long as the one or more awake requests are active.

2. The apparatus of claim 1, wherein the control logic is to cause the processor to enter the first low power consumption state based on a source of a wake event.

3. The apparatus of claim 1, further comprising memory to store operating system software, wherein the operating system software is to trigger a wake event.

4. The apparatus of claim 3, wherein the operating system software is to trigger the wake event based on a timer.

5. The apparatus of claim 1, wherein the control logic is to determine whether the processor is to enter the first low power consumption state based on one or more of workload and usage conditions in a platform that comprises the processor.

6. The apparatus of claim 1, wherein the second low power consumption state comprises an idle state or a standby state.

7. The apparatus of claim 1, further comprising memory to store application software, wherein the application software is to trigger a wake event.

8. The apparatus of claim 7, wherein the application software is to trigger the wake event based on a timer.

9. The apparatus of claim 1, wherein a wake event is to indicate resumption from a platform idle state.

10. The apparatus of claim 1, wherein the processor is to comprise a plurality of processor cores, wherein a wake event is to cause at least one of the plurality of the processor cores to wake from the first low power consumption state or second low power consumption state.

11. The apparatus of claim 1, wherein the threshold time period is about 60 seconds.

12. A method comprising:
causing a processor to enter a first low power consumption state instead of a second low power consumption state based on a threshold time period between a first wake event and a second wake event, wherein the first wake event or the second wake event are to each correspond to one of a plurality of awake requests, wherein the first low power consumption state consumes more power than the second low power consumption state; and
determining whether the processor enters the first low power consumption state based on a scenario and one of the plurality of awake requests, wherein at least one of the plurality of awake requests causes prevention of entry into the second low power consumption state by the processor for as long as the one or more awake requests are active.

13. The method of claim 12, further comprising causing the processor to enter the first low power consumption state based on a source of a wake event.

14. The method of claim 12, further comprising storing operating system software in memory, wherein the operating system software triggers a wake event.

15. The method of claim 14, wherein the operating system software triggers the wake event based on a timer.

16. The method of claim 12, further comprising determining whether the processor enters the first low power consumption state based on one or more of workload and usage conditions in a platform that comprises the processor.

17. The method of claim 12, wherein the second low power consumption state comprises an idle state, a sleep state, or a standby state.

18. One or more non-transitory computer-readable media comprising one or more instructions that when executed on at least one processor configure the at least one processor to perform one or more operations to:
cause the at least one processor to enter a first low power consumption state instead of a second low power consumption state based on a threshold time period between a first wake event and a second wake event, wherein the first wake event or the second wake event are to each correspond to one of a plurality of awake requests, wherein the first low power consumption state consumes more power than the second low power consumption state; and
determine whether the at least one processor enters the first low power consumption state based on a scenario and one of the plurality of awake requests, wherein at least one of the plurality of awake requests is to cause prevention of entry into the second low power consumption state by the at least one processor for as long as the one or more awake requests are active.

19. The one or more computer-readable media of claim 18, further comprising one or more instructions that when executed on the at least one processor configure the at least one processor to perform one or more operations to cause the processor to enter the first low power consumption state based on a source of a wake event.

20. The one or more computer-readable media of claim 18, further comprising one or more instructions that when executed on the at least one processor configure the at least one processor to perform one or more operations to determine whether the at least one processor enters the first low power consumption state based on one or more of workload and usage conditions in a platform that comprises the processor.

* * * * *